United States Patent [19]

Hirose et al.

[11] Patent Number: 5,733,594
[45] Date of Patent: Mar. 31, 1998

[54] PALM OIL-BASED OIL AND FAT COMPOSITION

[75] Inventors: Tomokazu Hirose; Nobuyuki Suwa; Toru Tagawa, all of Yokohama, Japan

[73] Assignee: Mitsubishi Chemical Company, Japan

[21] Appl. No.: 770,116

[22] Filed: Dec. 20, 1996

[30] Foreign Application Priority Data

Dec. 21, 1995 [JP] Japan .................................. 7-333489

[51] Int. Cl.⁶ .................................................. A23D 7/005
[52] U.S. Cl. ............................ 426/611; 426/604; 426/612
[58] Field of Search ................................. 426/611, 604, 426/609, 612

[56] References Cited

U.S. PATENT DOCUMENTS

| | | | |
|---|---|---|---|
| 3,787,216 | 1/1974 | Wingerd | 426/609 |
| 4,847,105 | 7/1989 | Yokobou | 426/611 |
| 4,959,233 | 9/1990 | Schou | 426/611 |
| 5,472,482 | 12/1995 | Willets | 426/609 |
| 5,514,405 | 5/1996 | Yokomichi | 426/604 |
| 5,518,752 | 5/1996 | Ito | 426/604 |
| 5,536,524 | 7/1996 | Miller | 426/611 |

FOREIGN PATENT DOCUMENTS

| | | | |
|---|---|---|---|
| 0256585 | 2/1988 | European Pat. Off. | 426/604 |
| 0265003 | 4/1988 | European Pat. Off. | 426/604 |
| 61-271950 | 12/1986 | Japan | 426/604 |
| 1458568 | 12/1976 | United Kingdom | 426/611 |
| 2280196 | 1/1995 | United Kingdom | 426/604 |

*Primary Examiner*—Carolyn Paden
*Attorney, Agent, or Firm*—Nixon & Vanderhye

[57] ABSTRACT

The present invention relates to a fats and oils composition comprising:

(A): fats and oils comprising palm oil as a main component, (B): fatty acid polyglycerine ester of 0.05 to 5% by weight based on the weight of the fats and oils composition, which has a degree of esterification of 50% or more, and comprises as a constituent fatty acid, oleic acid and palmitic acid of not less than 80% by weight based on the weight of constituent fatty acid, the molar ratio (%) of the oleic acid to the palmitic acid being 90:10 to 10:90, and (C): of fatty acid salt of 0.02 to 8% by weight based on the weight of the component (B).

12 Claims, No Drawings

PALM OIL-BASED OIL AND FAT COMPOSITION

BACKGROUND OF THE INVENTION

The present invention relates to oil and fat compositions with a high content of palm oil, and more particularly relates to such palm oil-based oil and fat compositions having improved creaming and water absorption properties, which are useful for producing of baked confections.

Baked confections such as cookies and cakes are usually produced by a "sugar-batter method". This method comprises mixing a shortening and margarine with sucrose, stirring the mixture to maintain uniform and fine air bubbles in the mixture (to be required good creaming property), then adding egg, cow's milk, liquidsugar, etc., to have them sufficiently incorporated in the mix (to be required good water absorption property), lastly compounding wheat flour modestly and baking the dough.

The shortening and margarine have been produced by using one or mixture of two or more of edible oils and fats, rapidly cooling and kneading that by a rotator or combinator, followed by maturing. Recently, attention is focused on palm oil as a useful vegetable oil and its use and demand are expanding steadily. It is also used as base oil for shortening and margarine. Palm oil collected from coconuts of oil palm, is a half-solid plastic oil having a melting point of 31° to 35° C. resembling tallow or lard. Palm oil, however, involves difficult problems in its practical use. For instance, since palm oil contains high-melting-point saturated triglycerides, typically 1,3-dipalmitoyl-2-oleoylglycerine (hereinafter referred to as POP) which is a 2-saturated 1-unsaturated triglyceride in a high proportion, it tends to produce coarse crystals at the step of rapid cooling and kneading in the production process or during storage of the product, and such crystals roughen texture of the shortening or margarine and may cause formation of inferior products when palm oil is used as a base material of confections.

Also, since palm oil or palm oil-based oils and fats is remarkably poor in creaming property as compared with other types of oils and fats such as fish oils, there raise problems such as low workability due to elongated time for stirring or limited volume of cakes that can be produced.

In order to solve these problems, it has been attempted to inhibit growth of oil and fat crystals by adding a polyglycerin fatty acid ester in which the esterification degree of the saturated fatty acid is not less than 50% (Japanese Patent Application Laid-Open (KOKAI) No. 59-166562) or a polyhydric alcohol fatty acid ester comprising a mixture of a saturated fatty acid and an unsaturated fatty acid (Japanese Patent Application Laid-Open (KOKAI) Nos. 62-442 and 5-199838), to palm oil or palm oil-based oils and fats. These methods, however, have been unable to provide an oil and fat composition possessing desired oil and fat crystal growth-inhibiting effect as well as satisfactory creaming and water absorption properties.

The said polyglycerin fatty acid esters are an officially approved food additive and known as a high-safety surfactant. They are principally used as emulsifier or solubilizer for foodstuffs, and further their application to cosmetics, pharmaceuticals and detergents is also being attempted.

SUMMARY OF THE INVENTION

The object of the present invention is to provide palm oil-based oil and fat compositions in which coarsening of oil and fat crystals is inhibited and which are improved in creaming property and water absorption property.

By the present inventors' earnest studies for accomplishing the above object, it has been found that by adding a polyglycerin fatty acid ester having a specific fatty acid moiety and a fatty acid salt to an oil and fat composition mainly comprising palm oil, the produced composition is capable of taking hold of triglycerides which form coarse crystals to inhibit growth of crystals, thereby improving the creaming property and water absorption property. The present invention has been based on the above finding.

In an aspect of the present invention, there is provided a fats and oils composition comprising:

(A): fats and oils comprising palm oil as a main component, (B): fatty acid polyglycerine ester of 0.05 to 5% by weight based on the weight of the fats and oils composition, which has a degree of esterification of 50% or more, and comprises as a constituent fatty acid, oleic acid and palmitic acid of not less than 80% by weight based on the weight of constituent fatty acid, the molar ratio (percentage) of said oleic acid to said palmitic acid being 90:10 to 10:90, and (C): of fatty acid salt of 0.02 to 8% by weight based on the weight of said component (B).

DETAILED DESCRIPTION OF THE INVENTION

The present invention is descried more detail.

Palm oil used as component (A) of the palm oil-based oil and fat compositions according to the present invention is not specifically restricted as far as it is derived from an oil collected from coconuts of oil palm. The collected palm oil may be subjected to appropriate treatments as refining, separation, ester exchange, hydrogenation, etc., and may contain free fatty acids in large proportions.

The oil and fat used as the component (A) according to the present invention may comprise palm oil alone or a composition of palm oil and other types of oils and fats with the palm oil content being not less than 50% by weight, preferably not less than 60% by weight, more preferably not less than 70% by weight based on the weight of the fats and oils composition. As other types of oils and fats, there can be used ordinary processed oil and fat materials including vegetable oils such as rape seed oil, corn oil, cottonseed oil, soybean oil, cocoa oil, etc., and animal oils and fats such as tallow, lard, fish oil, butterfat, etc. The content of other types of oils and fats in the fats and oils composition of the present invention is the balance.

Polyglycerin (hereinafter referred to as PoG) comprising the polyglycerin fatty acid ester (hereinafter referred to as PoGE) used as component (B) of the composition of the present invention preferably has an average degree of polymerization of 4 to 25 and a hydroxyl value of 800 to 1,100, preferably 850 to 1100. When the average degree of polymerization of PoG is more than 25, viscosity of the reaction solution in the PoGE-producing reaction system is increased and the reaction may not proceed. When the degree of polymerization of PoG is less than 4, the aimed creaming property and water absorbing property may not be attained. Considering the application to foods and pharmaceuticals, the average degree of polymerization of PoG is preferably in the range from 4 to 18, more preferably from 4 to 12. When the hydroxyl value is less than 800 or not more than 1,100, the aimed creaming property and water absorbing property may not be attained.

PoGE (component (B)) is constituted by oleic acid and palmitic acid in an amount of not less than 80% by weight of the component fatty acid. The molar ratio (%) of oleic acid to palmitic acid is in the range of 90 to 10:10 to 90. When PoGE having the molar ratio of oleic acid to palmitic acid of more than 90 mol % is used, the effect of the composition for inhibiting the growth of palm oil crystals lowers. When PoGE having the molar ratio of oleic acid to palmitic acid of less than 10 mol % is used, the produced composition may not be excellent in the creaming property and water absorption property. PoGE used in the present invention may comprise oleic acid and palmitic acid in a prescribed molar ratio in a component PoGE molecule having oleic acid and palmitic acid, or may comprise a mixture of a constituent oleic PoGE (PoGE having oleic acid) and a constituent palmitic PoGE (PoGE having palmitic acid) so as to fall in a prescribed molar ratio.

The fatty acid constituting PoGE may have, beside oleic acid and palmitic acid, a saturated or unsaturated fatty acid having carbon number of 12 to 22, preferably 12 to 18 with a content of less than 20% by weight. Examples of such saturated or unsaturated fatty acids include lauric acid, myristic acid, stearic acid, behenic acid, linoleic acid, erucic acid and the like. Among of which them, lauric acid and erucic acid are preferred.

Degree of esterification (%) of PoGE is not less than 50%, preferably 60 to 80%. If the degree of esterification is less than 50%, oleophilicity of the ester lowers to badly deteriorate the solubility of the ester in oils and fats, so that in this case the intended effect of the present invention may not be attained. The "degree of esterification (%)" referred to herein was determined by measuring hydroxyl value (hereinafter referred to as OHV), saponification value (hereinafter referred to as SV) and acid value (hereinafter referred to as AV) of PoGE according to the Standard Oil and Fat Property Testing Method (formulated by Japan Oleochemical Association), and dividing the total number of hydroxyl groups including esterified hydroxyl groups in the sample by the number of esterified hydroxyl groups, using the following equation (1):

$$\text{Degree of esterification (\%)} = (SV-AV) \times 100/(OHV+SV-AV) \quad (1)$$

The content of PoGE in the oil and fat composition is 0.05 to 5% by weight, preferably 0.1 to 3% by weight. When the PoGE content is less than 0.05% by weight, the effect of PoGE may be too small to attain the object of the present invention. When PoGE content is more than 5% by weight, its effect may not rise above a certain level, and thus no greater effect may be expected from increasing PoGE content.

Fatty acid salt used as component (C) of the palm oil-based oil and fat composition according to the present invention is an alkaline metal or alkaline earth metal salt, preferably sodium or potassium salt, of the saturated or unsaturated fatty acid having carbon number of 12 to 22, preferably 12 to 18 used as a constituent fatty acid salt of PoGE.

Since usually fatty acid salt is contained in PoGE which is formed as a by-product of the reaction between an alkaline catalyst and starting fatty acid in the process of producing PoGE from a fatty acid and PoG, the fatty acid salt of the by-product may be used as it is. Also, fatty acid salt may be added separately to PoGE.

Fatty acid salt of component (C) is contained in an amount of 0.02 to 8% by weight, preferably 0.05 to 5% by weight based on the weight of PoGE (component (B)). When the fatty acid salt content is less than 0.02% by weight based on PoGE (component (B)), the aim of the present invention may not be attained sufficiently. When the content of fatty acid salt is more than 8% by weight, its effect is saturated and no greater effect can be expected from increasing its content.

The content of fatty acid salt is adjusted to fall within the above-defined range by controlling the feed of alkaline catalyst in the preparation of PoGE. Adjustment of fatty acid salt content can be also performed by separately adding fatty acid salt.

The content of fatty acid salt can be determined from the following equation (2):

$$Z = X \times W_{fat} \times (M_{fat} + M_{cat} - 1)/W_{PoGE} + y \quad (2)$$

wherein

X: amount of alkaline catalyst (mol %)

$W_{fat}$: amount of fatty acid supplied (g)

$M_{fat}$: molecular weight of fatty acid (g/mol)

$M_{cat}$: molecular weight of catalyst alkaline metal (g/mol)

$W_{PoGE}$: amount of PoGE produced (g)

y: amount of post-added fatty acid salt (wt %)

Z: amount of fatty acid salt (wt %)

PoGE is usually produced from esterification reaction of PoG obtained from polycondensation of glycerin and a fatty acid (Japanese Patent Application Laid-Open (KOKAI) Nos. 62-45513, 58-185537, 63-23837 and 63-68541). Esterification reaction is usually carried out at 180° to 270° C. in the presence of an alkaline catalyst. In the present invention, it is preferred to use a method in which the reaction is initially carried out at 180° to 270° C., and when the fatty acid conversion reached 70%, reaction temperature is raised by 10° to 80° C.

As alkaline catalyst, hydroxides of alkaline metals and alkaline earth metals can be used, of which potassium hydroxide and sodium hydroxide are preferred because of ease of handling and easy availability. Such alkaline catalyst is added in an amount of preferably 0.02 to 2 mol %, more preferably 0.06 to 0.5 mol % based on the molar of the fatty acid because addition of alkaline catalyst in this amount range is most suited for controlling formation of the by-product fatty acid salt to a proper level. When the catalyst amount is less than 0.02 mol %, unreacted PoG may remain in large quantities in the reaction product, causing co-existence of hydrophilic PoG and high-substitution-degree PoGE having low hydrophilicity to make the system non-uniform. On the other hand, when the catalyst amount is more than 2 mol %, the by-product fatty acid salt from the reaction of a fatty acid and an alkaline catalyst may separate out to adversely affect the oil and fat crystal growth-inhibiting effect by PoGE.

In preparation of the oil and fat composition of the present invention, a predetermined amount of PoGE may be initially added to starting palm oil or other oil and fat, thereby producing the oil and fat composition, or PoGE may be added in the process of producing the oil and fat composition.

In the oil and fat composition of the present invention, beside PoGE, various other substances such as lecitin, dairy products, spicery, seasonings, sweetenings, sugars, common salt, emulsion stabilizing paste, etc. may be added according to the purpose of use of the composition produced.

The oil and fat composition of the present invention is used by blending to the base material of a solid or liquid oil and fat preparation such as shortening. The composition contributes greatly to inhibiting coarsening of the oil and fat crystals to allow obtainment of oil and fat preparations (such as those for biscuits, cookies and other cakes) with good texture. Also, the oil and fat composition of the present invention is capable of enhancing water and egg uptake of oils and fats and thus useful for obtaining the oil and fat products that conform to the recent trend toward low calory and high quality.

EXAMPLES

The present invention is explained in more detail in the following examples, but it should be recognized that the scope of the present invention is not restricted to these examples.

Evaluation of the oil and fat composition was made regarding crystal coarsening inhibiting efficacy, creaming property and water absorption property, which were indicated in terms of crystal state, creaming value and water absorption index, respectively.

Crystal Coarsening Inhibiting Efficacy

PoGE was added (in a prescribed amount shown in Table 1) to refined palm oil, dissolved by heating, and mixed up to prepare PoGE-containing palm oil. One drop of the said PoGE-containing palm oil was put on slide glass for microscope, a cover glass was mounted, and the obtained specimen was rapidly cooled to 0° C. to crystallize and further kept at 20° C. Growth and coarsening of the crystals were observed periodically under a microscope. The crystal state was evaluated as follows.

⊚ Maximum crystal size was not more than 2 μm.

○ Maximum crystal size was not more than 5 μm.

△ Maximum crystal size was more than 5 μm and less than 15 μm.

X Maximum crystal size was not less than 15 μm.

In the present invention, when the crystal state evaluation is ⊚ or ○, the oil and fat composition is part to practice use.

Creaming Property 200 g of shortening was whipped by a mixer (KENMIX, manufactured by Aikosha Co., Ltd.) (operated at 167 r.p.m., with the container cooled with 18° C. circulating water; room temperature: 20° C.) to let the shortening take up air. Specifie gravity of the shortening was measured periodically at intervals of 5 minutes. By use of the minimum value of the measured specific gravity which is regarded as an oil and fat specific gravity after whipping, the creaming value was calculated from the following equation (3):

$$\text{Whipping creaming value (\%)} = \frac{\text{Oil and fat specific gravity before whipping}}{\text{Oil and fat specific gravity after whipping}} \times 100 \quad (3)$$

In the present invention, when the creaming value is not less than 150%, the oil and fat composition is put to practice use.

Water Absorption Property

After 40 minutes of whipping, water was added at a rate of 20 ml/min while continuing the whipping operation. A state in which water could no longer be mingled was regarded as reaching the end point. The water absorption index was calculated from the following equation (4):

$$\text{Water absorption index} = \frac{\text{Water absorption (g)}}{\text{Oil and fat weight (g)}} \times 100 \quad (4)$$

In the present invention, when the water absorption index is not less than 300%, the oil and fat composition is put to practice use.

EXAMPLES 1–9 AND COMPARATIVE EXAMPLES 1–9

Using the prescribed amounts of palmitic acid (with purity over 95%, manufactured by Nippon Yushi Co., Ltd.), oleic acid (with purity over 80%, manufactured by Nippon Yushi Co., Ltd.) and PoG (decapolyglycerin #750; average degree of polymerization: 10; hydroxyl value: 888 mg KOH/g; manufactured by Sakamoto Pharmaceutical Co., Ltd.), there were produced PoGE samples with the molar ratios of component fatty acids shown in Table 1. The reaction was carried out by feeding prescribed amounts of fatty acids to a stirring-type reactor provided with a heating jacket, and after the temperature was raised to 240° C., a 10 wt % aqueous solution of sodium hydroxide was added in the amount shown in Table 1 to conduct an esterification reaction at this temperature for 4 hours. Fatty acid conversion at this point was 90%. This reaction mixture was successively heated to 260° C. and kept in this state for 4 hours, raising the fatty acid conversion to 99% or more to obtain PoGE. OHV, SV and AV of the thus obtained PoGE were measured and the degree of esterification was calculated from the equation (1). The amount of fatty acid salt was calculated from the equation (2).

Prescribed amounts (shown in Table 1) of the thus obtained PoGE or a commercial sucrose fatty acid (acid value:0.10; iodine value: 51; ascending melting point: 36° C.) was added to 100 parts by weight of refined palm oil, melted by heating and mixed to obtain oil and fat compositions, and their crystal coarsening-inhibiting effect was evaluated. In Examples 6–8, potassium laurate was used as post-added fatty acid salt.

To 70 parts of each of the thus obtained oil and fat compositions were added 30 parts of soybean hardened oil (acid value: 0.02; iodine value: 81; ascending melting point: 32° C.) and a prescribed amount (shown in Table 1) of fatty acid salt, and they were dissolved by heating and mixed to prepare a processed oil and fat composition and then the obtained composition was rapidly cooled to 3° C. and headed by Agihomomixer (manufactured by Tokushu Kika Kogyo Co., Ltd.) to obtain a shortening. After 3-day maturing at 25° C., the shortening preparations were subjected to evaluation of creaming property and water absorption property. The results are shown in Table 1.

As is seen from Table 1, the palm oil-based oil and fat composition containing 0.05 to 5% by weight of a polyglycerin fatty acid ester, in which the molar ratio of oleic acid to palmitic acid in the fatty acid moiety is 90:10 to 10:90, the degree of esterification is not lower than 50%, and the amount of fatty acid salt is 0.08 to 2% by the weight based on the weight of PoGE, was capable of maintaining fine crystals even one month after preparation of the composition and gave good results in use as base material in confectionery producing.

TABLE 1

| | Polyglycerin fatty acid ester | | | | Fatty acid salt | | Evaluation results | | |
| --- | --- | --- | --- | --- | --- | --- | --- | --- | --- |
| | Component (B) fatty acids (molar ratio) | Degree of esterification (%) | Amount of catalyst (mol %)*1 | PoGE Amount added (wt parts)*2 | Amount of post-added fatty acid salt (wt %)*3 | Amount of fatty acid salt (wt %)*4 | Crystal state | Creaming value (%) | Water absorption index (%) |
| Example 1 | C16/C18' (50/50) | 62 | 0.1 | 1 | 0 | 0.07 | O | 184 | 376 |
| Example 2 | C16/C18' (50/50) | 93 | 0.1 | 1 | 0 | 0.07 | O | 177 | 321 |
| Example 3 | C16/C18' (50/50) | 70 | 0.5 | 1 | 0 | 0.35 | O | 180 | 388 |
| Example 4 | C16/C18' (70/30) | 71 | 0.1 | 1 | 0 | 0.07 | O | 167 | 395 |
| Example 5 | C16/C18' (40/60) | 72 | 0.1 | 1 | 0 | 0.08 | O | 187 | 876 |
| Example 6 | C16/C18' (40/60) | 72 | 0.1 | 1 | 0.4 | 0.5 | O | 167 | 787 |
| Example 7 | C16/C18' (40/60) | 72 | 0.1 | 1 | 0.9 | 1 | O | 161 | 795 |
| Example 8 | C16/C18' (40/60) | 72 | 0.1 | 1 | 4.9 | 5 | O | 161 | 690 |
| Example 9 | C16/C18' (40/60) | 72 | 0.1 | 0.5 | 0 | 0.07 | O | 155 | 312 |
| Comp. Example 1 | (Not added) | — | — | — | — | — | X | 136 | 60 |
| Comp. Example 2 | P-170 | — | — | 1 | — | — | X | 142 | 102 |
| Comp. Example 3 | S-170 | — | — | 1 | — | — | X | 128 | 129 |
| Comp. Example 4 | C18 | 64 | 0.1 | 1 | 0 | 0.08 | Δ | 125 | 175 |
| Comp. Example 5 | C16 | 64 | 0.1 | 1 | 0 | 0.07 | O | 140 | 179 |
| Comp. Example 6 | C18' | 63 | 0.1 | 1 | 0 | 0.08 | Δ | 144 | 694 |
| Comp. Example 7 | C16/C18' (50/50) | 39 | 0.1 | 1 | 0 | 0.07 | Δ | 141 | 382 |
| Comp. Example 8 | C16/C18' (50/50) | 70 | 0.02 | 1 | 0 | 0.01 | Δ | 145 | 376 |
| Comp. Example 9 | C16/C18' (50/50) | 72 | 0.1 | 0.03 | 0 | 0.07 | X | 138 | 96 |

P-170: Sucrose palmitic acid ester (manufactured by Mitsubishi Chemical Foods Co., Ltd.)
S-170: Sucrose stearic acid ester (manufactured by Mitsubishi Chemical Foods Co., Ltd.)
C16: Palmitic acid (purity over 95%, manufactured by Nippon Yushi Co., Ltd.)
C18: Stearic acid (purity 70%, manufactured by Kao Corp.)
C18': Oleic acid (purity 80%, manufactured by Nippon Yushi Co., Ltd.)
*1: Amount of catalyst in percent by weight to fatty acid in PoGE forming reaction.
*2: Amount of PoGE per 100 parts by weight of palm oil.
*3: Amount of fatty acid salt other than the by-product of PoGE forming reaction, in percent by weight to the whole composition.
*4: Content of fatty acid salt in percent by weight to the whole composition.

What is claimed is:

1. A fats and oils composition comprising:
   (A): fats and oils comprising palm oil as a main component,
   (B): fatty acid polyglycerine ester of 0.05 to 5% by weight based on the weight of the fats and oils composition, which has a degree of esterification of 50% or more, and comprises as a constituent fatty acid, oleic acid and palmitic acid of not less than 80% by weight based on the weight of constituent fatty acid, the molar ratio (%) of said oleic acid to said palmitic acid being 90:10 to 10:90, wherein the polyglycerine has an average degree of polymerization of 4 to 25 and a hydroxyl value of 800 to 1100 and
   (C): fatty acid salt of 0.02 to 8% by weight based on the weight of said component (B).

2. The fats and oils composition according to claim 1, which further comprises at least one of other vegetable fats and oils than palm oil, and animal fats and oils.

3. The fats and oils composition according to claim 2, wherein other vegetable fats and oils than palm oil are rape seed oil, corn oil, cottonseed oil soybean oil or cocoa oil.

4. The fats and oils composition according to claim 2, wherein the animal fats and oils are tallow, lard, fish oil or butterfat.

5. The fats and oils composition according to claim 1, wherein the content of the palm oil is not less than 50% by weight based on the weight of the fats and oils composition.

6. The fats and oils composition according to claim 1, wherein the content of the palm oil is not less than 60% by weight based on the weight of the fats and oils composition.

7. The fats and oils composition according to claim 1, wherein the content of the palm oil is not less than 70% by weight based on the weight of the fats and oils composition.

8. The fats and oils composition according to claim 1, wherein the fatty acid polyglycerine ester is prepared by the esterification with polyglycerine and fatty acid in the presence of alkali catalyst of 0.02 to 2 mol % based on fatty acid.

9. The fats and oils composition according to claim 1, wherein the esterification percentage of the fatty acid polyglycerine ester is 60 to 80%.

10. The fats and oils composition according to claim 1, wherein the polyglycerine has an average degree of polymerization of 4 to 18.

11. The fats and oils composition according to claim 1, wherein the polyglycerine has an average degree of polymerization of 4 to 12.

12. The fats and oils composition according to claim 1, wherein the fatty acid salt is alkaline metals or alkaline earth metals salt of saturated or unsaturated fatty acid having carbon number of 12 to 22.

* * * * *